United States Patent [19]
Walker

[11] Patent Number: 5,828,855
[45] Date of Patent: Oct. 27, 1998

[54] SOCKET SIMULATION PROTOCOL FOR NETWORK PRINTING SYSTEMS

[75] Inventor: Ted W. Walker, Sunnyvale, Calif.

[73] Assignee: Apple Computer, Inc., Cupertino, Calif.

[21] Appl. No.: 470,968

[22] Filed: Jun. 6, 1995

[51] Int. Cl.⁶ ..................................................... H01J 13/00
[52] U.S. Cl. ........................... 395/309; 395/500; 395/527; 395/200.57; 395/200.6; 395/831; 395/838; 395/285
[58] Field of Search .......................... 395/200.02, 200.03, 395/200.1, 200.12, 200.14, 200.17, 200.2, 828, 827, 831, 309, 285, 311, 837, 838, 839, 822, 500, 527, 112, 113, 114, 200.53–200.6; 370/401

[56] References Cited

U.S. PATENT DOCUMENTS

| | | | |
|---|---|---|---|
| 4,453,211 | 6/1984 | Askinazi et al. | 395/821 |
| 5,220,674 | 6/1993 | Morgan et al. | 395/800 |
| 5,265,239 | 11/1993 | Ardolino | 395/500 |
| 5,388,213 | 2/1995 | Oppenheimer et al. | 395/200 |
| 5,440,697 | 8/1995 | Boegel et al. | 395/500 |
| 5,485,460 | 1/1996 | Schrier et al. | 370/94.1 |
| 5,537,417 | 7/1996 | Sharma et al. | 370/94.1 |
| 5,537,626 | 7/1996 | Kraslavsky et al. | 395/828 |
| 5,550,957 | 8/1996 | Davidson, Jr. et al. | 395/114 |
| 5,568,612 | 10/1996 | Barrett et al. | 395/200.01 |
| 5,577,172 | 11/1996 | Vatland et al. | 395/114 |
| 5,579,087 | 11/1996 | Salgado | 355/202 |
| 5,580,177 | 12/1996 | Gase et al. | 400/61 |
| 5,596,723 | 1/1997 | Romohr | 395/200.16 |
| 5,636,333 | 6/1997 | Davidson, Jr. et al. | 395/114 |
| 5,638,497 | 6/1997 | Kimber et al. | 395/114 |
| 5,647,056 | 7/1997 | Barrett et al. | 395/200.1 |
| 5,682,478 | 10/1997 | Watson et al. | 395/200.12 |
| 5,692,111 | 11/1997 | Marbry et al. | 395/114 |

OTHER PUBLICATIONS

D.E. Comer et al., "Client–Server Programming and Applications," *Internetworking with TCP/IP*, vol. III, pp. 49–55, 1993.

*Primary Examiner*—Ayaz R. Sheikh
*Assistant Examiner*—Raymond N Phan
*Attorney, Agent, or Firm*—Burns, Doane, Swecker & Mathis, L.L.P.

[57] ABSTRACT

A network printing system is provided for allowing a single channel connection to support multiple channel connections when implemented over a direct connect, non-network device. More particularly, a socket simulation protocol (SSP) is incorporated into the printing system for providing multiple data paths for allowing serial based host drivers to interact with the network printer in the same synchronous model as in multiple connection based drivers. SSP enables a normalized interface to the printing system so that various heterogeneous network services protocol/ports may interact in the same way and for also enabling new protocol/ports to be easily extended and integrated into the network printing system.

37 Claims, 6 Drawing Sheets

SOCKET SIMULATION PROTOCOL FOR NETWORK PRINTING SYSTEMS

FIELD OF THE INVENTION

The present invention is directed to a network printing system that allows a single channel to support multiple connections or circuits when implemented over a direct connect, non-network device. More particularly, the present invention provides a socket simulation protocol (SSP) for supporting a host computer port which alternates between two different types of protocols to interact with the network printer in the same way as other network ports.

BACKGROUND OF THE INVENTION

As the size of network systems increases from a few connected computers located near each other to several thousand machines of various types and sizes scattered at great distances from each other, the demands on the network printers also increase. One of the most challenging demands in the implementation of network printers is connectivity. Typically, the network printer is a stand-alone peripheral device which is desired to perform in an increasing number of network and non-network communication environments. In network environments, the printer is desired to provide "seamless plug and play" connectivity for the continuous expansion of network service protocol/ports. For example, known network service protocol/ports that are desired to communicate with network printers are: printer access protocol (PAP)/LOCALTALK (LT); PAP/ETHERTALK (ET); transmission control protocol/internet protocol (TCP/IP); TCP/IP port 9100; LPR/TCP/IP; NOVELL remote printer or print server modes; bidirectional or unidirectional CENTRONICS; APPLETALK Data Stream Protocol (ADSP)/ ETHERTALK; ADSP/LOCALTALK; and NOVELL sequence packet exchange (SPX). LOCALTALK, ETHERTALK, NOVELL, CENTRONICS and APPLETALK are registered U.S. trademarks. These are just a few examples of the constantly increasing number of network protocol/ports that desire "plug and play" connectivity to the network printer.

A printer is a peripheral device that can be shared on a network connected to a print server. Also, a printer can directly connect to the network by including a network interface card or the network interface into the printer which allows the printer to run its own print server software and function as a regular node. In a typical Windows environment, the network printer is a one-way printer. In a one-way printer, the only communication path is from the host computer to the printer. As a result, the data is sent from the host computer to the printer without any ability for the printer to notify the host computer of the job status such as whether the print job has been successfully completed.

The use of a two-way printer has been developed for Macintosh systems (Apple Computer, Cupertino, Calif.). In the APPLETALK protocol used by the Macintosh systems, PAP is the protocol used for communication between the Macintosh host computers and printers. PAP sets up, maintains and terminates the connection between the host computer nodes and the network printer and also transfers the data from the host computers to the printers. PAP allows two-way communication from the network printer to the Macintosh host computer to the extent that the status of the network printer is sent to the Macintosh host computer through PostScript. However, most page description interpreters only allow one job to be processed at one time which prevents asynchronous interaction between multiple clients and the network printer.

Typically, networks utilize shared resource printers. FIG. 1 illustrates the use of a conventional shared resource printer in a network. A plurality of host computers $1_0, 1_1, \ldots 1_n$ and a printer 5 are connected in a network. The printer 5 includes a disk 6 connected internally or externally to the printer 5 for storing the print jobs sent from the host computers $1_{0 \ldots n}$ before being printed by the printer 5. In shared resource printers, the host computer that first sends a print job to the network printer will have its job printed. Other host computers attempting to have a print job printed by the network printer while another job is being printed will not be able to access the network printer. Therefore, these host computers will repeatedly try to access the network printer approximately every two seconds until the network printer becomes available. As a result, the speed of the network will be reduced by the network traffic due to the continuous polling of the host computers to the network printer during the time that the network printer is unavailable. This polling process is undesirable since a host computer will gain access to the printer, without any fair arbitration after the print job is completed if a number of host computers are attempting to gain access while the printer is busy.

Traditionally, print servers provided access to the network printers and ran the programs necessary to create and operate a print queue for jobs sent to the printers from the host computers. The print queue is a directory that stores into the disk 6 the print jobs waiting to be printed. The print jobs are then printed from the print queue in a FIFO sequence. The print servers require storing the job request and entire job data by spooling this data to the disk 6. Depending on the job size, millions of bytes of data may be spooled to the disk and therefore a large sized disk is necessary.

Even if a large sized disk is used, the disk capacity for storing print jobs may be exceeded when a number of host computers send print jobs to the printer at approximately the same time. When the capacity of the disk is reached, a back up procedure will be implemented where the printer will be polled every two seconds until space in the disk becomes available in a similar manner as in the shared resource printer.

File and print servers may be combined in the same machine on many networks for economical reasons. The main advantage for combining file and print servers is that files do not need to be sent from the file server to the print server machine and then from there to the printer in such a configuration. However, the disadvantage of combining the file and print servers is that the required control for the print queue and the printing activity takes away CPU time from other network activity. In either case, a disk is required to store the data for the entire print job and since the print job is sent from the host computer, spooled to a disk and then transmitted to the network printer when the printer becomes available, unnecessary network activity results.

To enable a printer to keep up with the demands of the network communication environments, the two-way communication between the host computers and the network printer must be expanded. To aid the users of the network, the job status and print job information must be received by the host computer. The one-way printer fails to meet this requirement because the only communication path is from the host computer to the printer. PAP provides some communication between host computers and network printers, but is limited in the information that is provided to the network clients from the network printer. The two-way communication provided by PAP through PostScript does not provide a synchronous interaction between multiple clients and the network printer which is demanded in the network environment.

Accordingly, it is desired to provide for a network printing system which enhances the two-way communication between host computers and the network printer. Further along these lines, it is desirable to allow a single channel to support multiple connections or circuits when implemented over a direct connect, non-network device such as RS-232 or CENTRONICS.

SUMMARY OF THE INVENTION

These and other objectives are achieved in accordance with the present invention by a printing system which provides a protocol for allowing a single channel to support multiple connections or circuits when implemented over a direct connect, non-network device. In an exemplary embodiment of the invention, a socket simulation protocol (SSP) is incorporated into the printing system for providing multiple data paths which allow serial based host drivers to interact with the network printer in the same asynchronous model as in multiple connection based drivers. SSP allows a uniform interface to various heterogeneous network services and also permits new protocol/ports to be easily extended and integrated.

As a further feature of the invention, SSP allows the network printer to achieve a "seamless plug and play" connectivity for the variety of protocol/ports. When SSP is implemented over a direct connect, non-network device such as RS-232 or CENTRONICS, a single channel may support multiple connections or circuits. Thereby, a normalized interface to the printing system may be achieved in which all protocol/ports of the heterogeneous network services interact in the same way.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION

Figure 2:
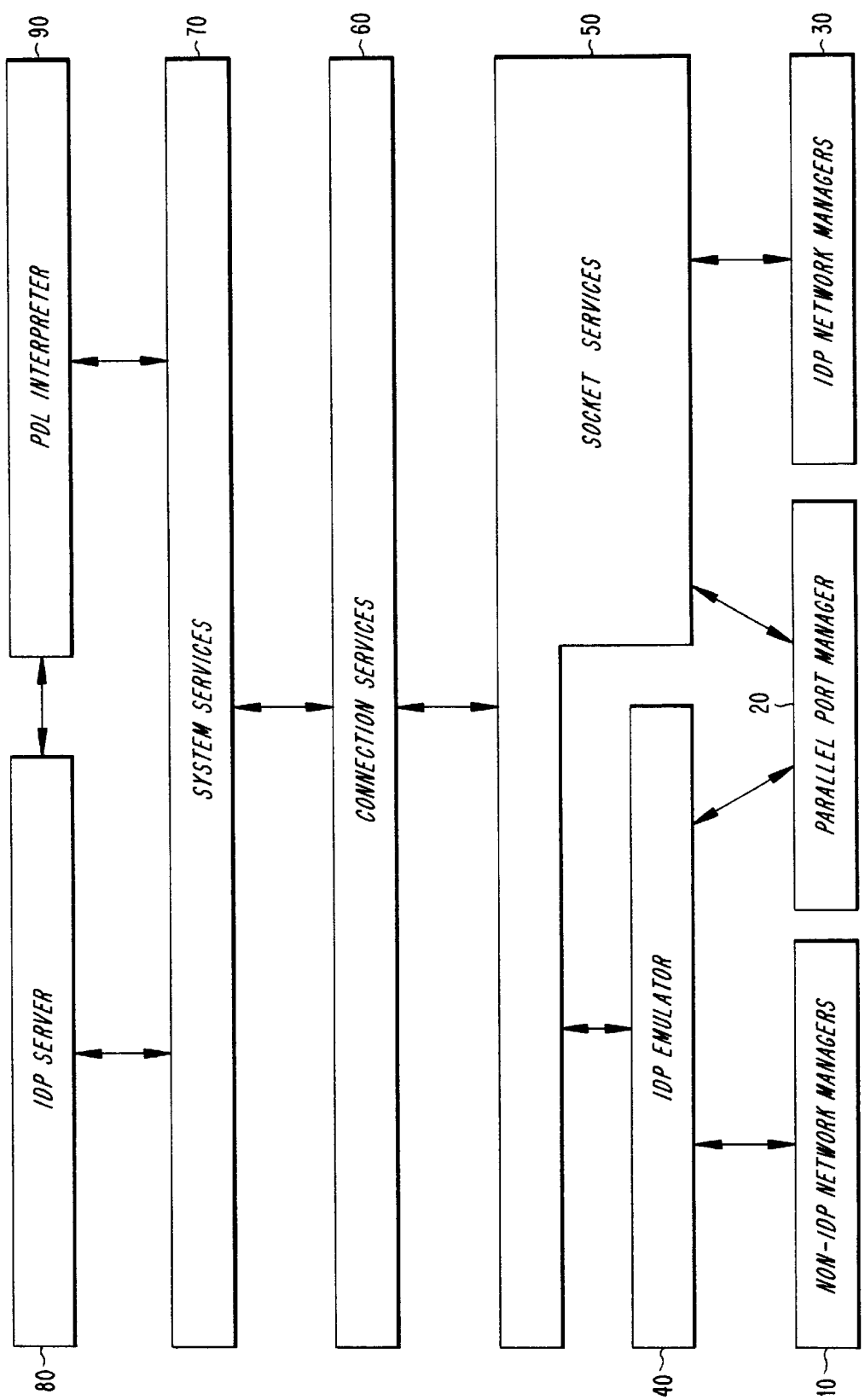
FIG. 2 illustrates the layers of the network architecture for an embodiment of the present invention.

FIG. 2 provides an illustrative embodiment for the layers of the architecture of the network printing system which implement a socket simulation protocol (SSP) in an embodiment of the present invention. Each of these layers provides a normalized interface with the lower layers and their relationship will be described from the lower layers, which interact with the clients, to the upper layers where all of the protocols/ports interact with the printer in essentially the same way. More particularly, SSP is provided to enhance two-way communication in a network printing system which uses multiple protocol/ports at the network layer (a heterogeneous network printing system). The interfacing of these layers may be implemented in one or more static memory devices, such as a ROM, which is installed within the network printer.

Imaging device protocol (IDP) provides an application layer network protocol that enhances the two way communication between a host computer and a network printer. IDP operates independently of the network layers below it and only requires that the transport protocol/port be bidirectional. A wide variety of heterogenous network protocols may be supported by IDP which places all of the incoming print job information in the print queue regardless of the protocol. Print job information from both IDP and non-IDP protocol/ports may be placed in the print queue by emulating IDP on the non-IDP protocol/ports. By emulating IDP on the non-protocol/ports, every client will look like IDP clients to the printer and clients of non-IDP protocols will therefore be completely backward compatible. Although non-IDP clients will not be able to use all of the enhanced features provided by IDP, a sufficient amount of information will provided from the non-IDP protocol/ports so that all of the jobs in the print queue will be able to be fairly arbitrated. For example, complete job name information will not be provided to the print queue for non-IDP clients and only information that a print job has been sent from a particular port will be entered in print queue. Thereby, print jobs from non-IDP clients may be entered in the print queue without having to store the actual print job data at the printer. Accordingly, the printing system for the embodiments of the present invention enable a wide variety of heterogenous network protocols to be fairly arbitrated at the printer.

At the lower layer of the architecture as illustrated in FIG. 2, are non-IDP network managers 10. The non-IDP network managers 10 control network ports that communicate with protocols other than IDP. Examples of some non-IDP protocols are: PAP/LT, PAP/ET, TCP/IP port 9100, LPR/TCP/IP, NOVELL remote printer or print server modes and bidirectional or unidirectional CENTRONICS. The non-IDP network managers 10 support these protocols to be backward compatible with existing communication protocols. The non-IDP clients cannot access all of the enhanced IDP features in the upper layers, which will be described in more detail, but these non-IDP clients will be able to enter the print queue for processing and will be fairly arbitrated with other print jobs from IDP clients.

IDP network managers 30 provide an interface for IDP protocol/ports. Some examples of protocol/ports that are presently configured for IDP mode communication include ADSP/ET, ADSP/LT, SPX (Novell), TCP/IP and bi-directional CENTRONICS. These protocol/ports are able to communicate with all of the IDP features which enhance the two-way communication between the host computers and the network printer. However, many other existing protocol/ports may be modified to support IDP and new protocols/ports may be created to support IDP. The interface of the IDP network managers with these IDP protocol/ports is preferably accomplished with a modified version of the Berkeley socket interface.

The Berkeley socket interface is a socket standard implemented in Berkeley Software Distribution (BSD) UNIX 4.3. (*Interworking with TCP/IP*, Vol. 3, Comer et al., Prentice Hall, 1993, pp. 49–55). The conventional Berkeley socket interface has the following major calls: a socket call for creating a socket; a bind call for binding a socket to an end point of a known protocol/port; a listen call for placing a socket bound to a known port and a passive mode; an accept call for accepting incoming connections from a passive socket; a connect call for opening active connections to remote endpoints; a read call for reading data from existing connections; a write call for writing data to existing connections; and a close call for closing existing connections. In an embodiment of the present invention the Berkeley socket interface has simplified the major calls to a passive open call for combining the functionality of the conventional socket, bind, and listen commands and an active open call for combining the functionality of the conventional socket and connect calls. The conventional accept, read, write and close calls have simply been renamed for the modified version of the Berkeley socket interface in the present embodiment.

The parallel port manager 20 provides both a non-IDP UNIX I/O interface and an IDP capable socket interface. The parallel port manager 20 is designed to support a host computer port which alternates between using IDP and non-IDP drivers/utilities to interact with the network printer. An example of such a port is a bi-directional CENTRONICS port. IDP mode communication over CENTRONICS ports should take place using a session/transport/network layer protocol. In a preferred embodiment of the present invention, SSP provides a session/transport/network layer protocol which allows the CENTRONICS port to be used in the same way as other network ports. The parallel port manager 20 is able to automatically sense the transitions between SSP and non-SSP data over CENTRONICS ports. SSP is a "bare bones" protocol that allows a single channel to support multiple connections or circuits when implemented over a direct connect, non-network device such as RS-232 or CENTRONICS, for example. Without SSP, all client/server interaction between the computer host and the network printer would have to be serialized. For example, the host driver could not query the status of the print queue while a job was being sent. The multiple data paths provided by SSP allow serial/CENTRONICS based host drivers to interact with the network printer in the same asynchronous model (on packet boundaries) as an ADSP or TCP based driver, for example.

Figure 7:
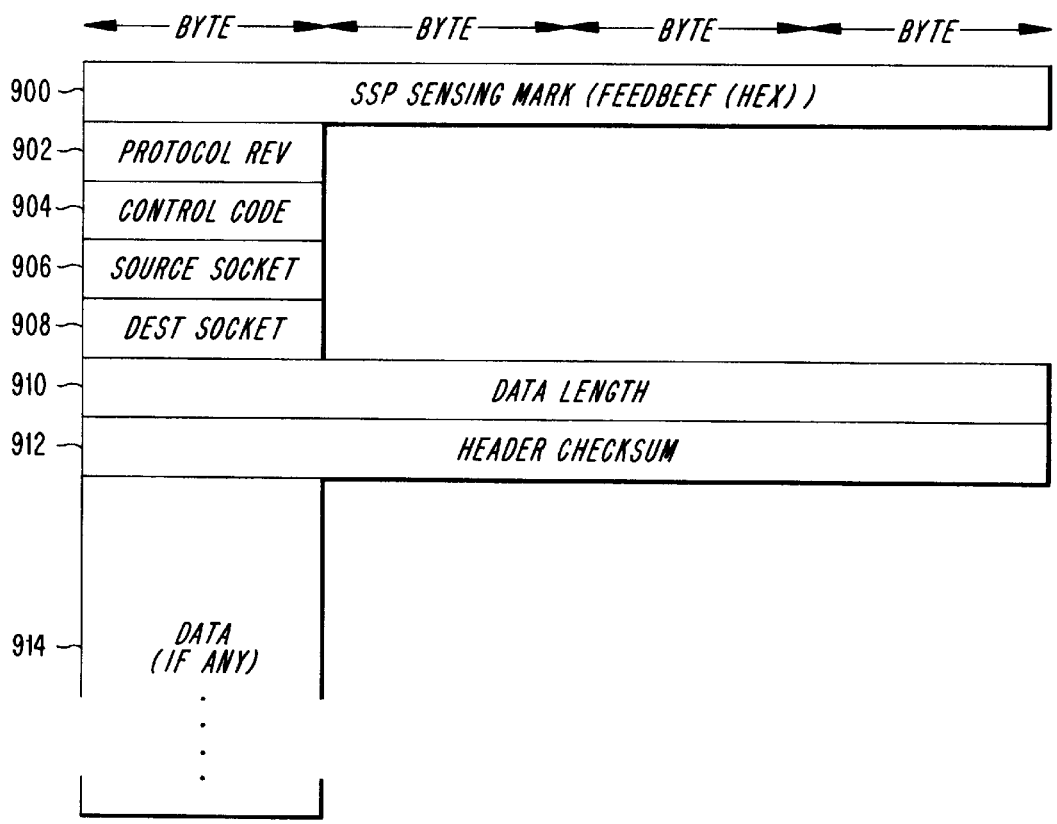
FIG. 7 illustrates an example of a packet format for an SSP packet in an embodiment of the present invention.

In one example of a packet format for an SSP packet for an embodiment of the present invention, the information may include an SSP sensing mark 900, a protocol revision bit 902, a control code 904, a source socket 906, a destination socket 908, a data length field 910, a header check sum field 912, and data 914 as illustrated in FIG. 7. The SSP sensing mark 990 may be used to help identify the transition between SSP and non-SSP data when non-SSP data, such as raw PostScript, for example, is sent through the raw data stream. The protocol revision bit 902 defines whether the protocol has been revised. The control code 904 defines the function of the message. Examples of functions that may be included are open connection, open connection reply, close connection, data transfer request, data transfer acknowledge, and data transfer functions. The control code 904 also includes an end of file indication and an end of message bit that typically forces the receiving driver to flush through any input data that has been buffered.

The source socket 906 and the destination socket 908 define the socket number of the sender and the destination, respectively. A connection is uniquely identified by a local printer and a remote pair of sockets. A socket can only support a single connection at a time. The data length field 910 is only defined in the data transfer acknowledge and data transfer functions and the data length field 910 describes the maximum data bits acceptable or the actual number of data bits, respectively. Similar to the SSP sensing mark 900, the header check sum field 910 exists to help differentiate SSP data from non-SSP data. The header check sum field 910 may be calculated as follows: combine the protocol revision bit 902, control code 904, source socket 906, and destination socket 908 bits into a 32-bit long word sequentially were protocol revision bit 902 is the highest order bit and the destination socket 908 is the lowest order of bit. The 32-bit long word is then logically ANDed with the SSP sensing mark 900 before being rotated one bit to the left and generating the header check sum field 910.

Examples of control codes 904 include open connection, open connection reply, data transfer request, data transfer acknowledge, data transfer, and close connection codes. The open connection code functions to open a logical connection between a caller's source socket and the destination's socket. The sender should supply the source socket and destination socket in order to have the receiver of an open connection respond with an open connection reply for an open connection to be completed. The open connection reply code functions returns and responds to an open connection code. The sender of the open connection reply should generate a unique socket for each connection. This new socket number may then be placed in the source socket field on the reply for use with all subsequent connection interaction. The data transfer request code functions when the requesting node wants to send data over and establish connection. The source socket and destination socket fields should be replied and the requestor waits for a data transfer acknowledge code before sending the data transfer packet.

The node that receives the data transfer code will reply with a data transfer acknowledge to notify the requester that the data transfer may take place in the connection specified by the source socket and destination socket fields. The data length field commonly defines the maximum number of data bits (excluding the SSP header) that may be sent by the requester. The data transfer code is a packet sent in response to the data transfer acknowledge code. The data transfer packet typically includes a standard SSP header followed by the data. The data length field in the header should contain the number of data bits that will follow the header portion of the packet. The data length should not exceed the value defined in the data transfer acknowledge packet. The end of message bit in the control code should be set if the packet being sent contains the last data packet in a logical message. The source socket and destination socket fields should match those defined in the data transfer request packet. The close connection code functions to close a logical connection. The sender should supply the source socket and the destination socket fields for the close connection to be completed.

The socket services layer 50 is the interface component to all socket interface I/O managers. Sockets are general purpose interprocess communication mechanisms which are logical entities through which programs or processes communicate with the network. Sockets are typically supported in libraries by UNIX implementations for operating systems such as DOS or OS/2 and for network operating systems such as NOVELL'S netware and APPLETALK. A socket interface is a set of functions associated with a particular network node and when a client interfaces with the socket, information and network services may be requested and received.

An IDP emulator 40 enables connections over non-IDP ports so that the upper layers may uniformly interface with both IDP and non-IDP clients. The IDP emulator 40 monitors connection requests on all non-IDP protocol/ports from the non-IDP network managers 10 and the parallel port manager 20 and emulates IDP requests as the connection requests are received. When a connection request is received from a non-IDP client, the IDP emulator 40 builds an IDP print job request message. The IDP emulator 40 ensures that print jobs from non-IDP protocols/ports are arbitrated fairly with the jobs from IDP protocols/ports so that jobs will be processed in the order from which the connection attempts are received.

The connection services layer 60 includes a client server connection protocol (CSCP) library. CSCP is a symmetric protocol that facilitates connection between servers and clients over connection-based stream-oriented protocols such as ADSP, TCP and SPX. CSCP resides in the presentation layer of the OSI seven-layer model for interfacing with one or more session level protocols. CSCP facilitates client and server connections by allowing clients of CSCP stacks to request passive or active connections for specific services on a specific node and specifies the service using an alpha-numeric string. Server applications, such as IDP, will minimally open a passive connection through the CSCP stack which specifies the service provided with a service specifier string. Clients of the server open an active connection through CSCP by specifying an identical service specifier string. CSCP implementations on the client and server nodes then negotiate the ports or sockets over which the client/server connection will take place, establish the connection, and return to their clients. Once the client/server connection is achieved, CSCP functions are completed.

Furthermore, CSCP facilitates reconnection to previously connected hosts. IDP uses the reconnection mechanism to implement remote queuing features, to subsequently request job data and to send asynchronous status updates to clients which support IDP. More particularly, IDP only stores the job data request at the printer when the printer is busy printing another job and the actual job data will remain locally at the host computer. Thereafter, the network printer will call back the host computer which corresponds to the first job data request queued in the print queue after the current print job is completed.

The system services layer 70 provides a uniform interface to all of the IDP and non-IDP network services. In a preferred embodiment, the system services layer 70 is an interface which is an extension of the UNIX I/O interface. Examples of the functions performed by the system services 70 are: open; close; reconnect; read; write; swrite; and ioctl. The swrite function is unique for the present embodiment. Only the swrite function enables a status description string to be passed to the I/O managers and the I/O managers may use or dispose of the status depending on the requirements of the protocol/port being managed.

The system services layer 70 also provides a buffered I/O layer for grouping read and write data into blocks of data which may be processed more efficiently. For example, buffers may be provided for 4K bytes of data. Thereby, the number of times that data is handed back and forth is reduced by eliminating the repeated processing of individual data and grouping the data in a larger block that may be easily processed.

The system services layer 70 interfaces with an IDP server 80 and a page description language (PDL) interpreter 90. The IDP server 80 is an application layer network protocol for enhancing the two-way communication between a host computer and the network printer. The IDP server 80 is independent of the network layers below and only requires that the transport be bidirectional. The IDP server 80 allows access to shared information in the network printer and enables two-way communication between the network clients and the network printer to exist at an enhanced level.

Some of the enhanced two-way communication provided by the IDP server 80 includes reading and modifying system parameters, adding and removing fonts, submitting print jobs and manipulating the print queue. By enabling clients of the printer to make job requests which are entered in the print queue without sending the actual print job data, an enhanced set of services for submitting print jobs, retrieving print data queue and asynchronously notifying clients with job status may be achieved. The PDL interpreter 90 may be provided for supporting PostScript, for example. Additional PDL interpreters may be provided to support other languages as desired. The presentation level data from non-IDP protocols/ports is assumed to be PDL data in the example configuration for the present embodiment. The non-IDP network managers 10 and the parallel port managers 20 may be implemented with a UNIX standard I/O interface in a preferred embodiment. The IDP emulator 40 then handles all of the non-IDP protocols/ports, provides a socket interface and emulates the CSCP/IDP interaction necessary to execute print job requests.

Figure 3:
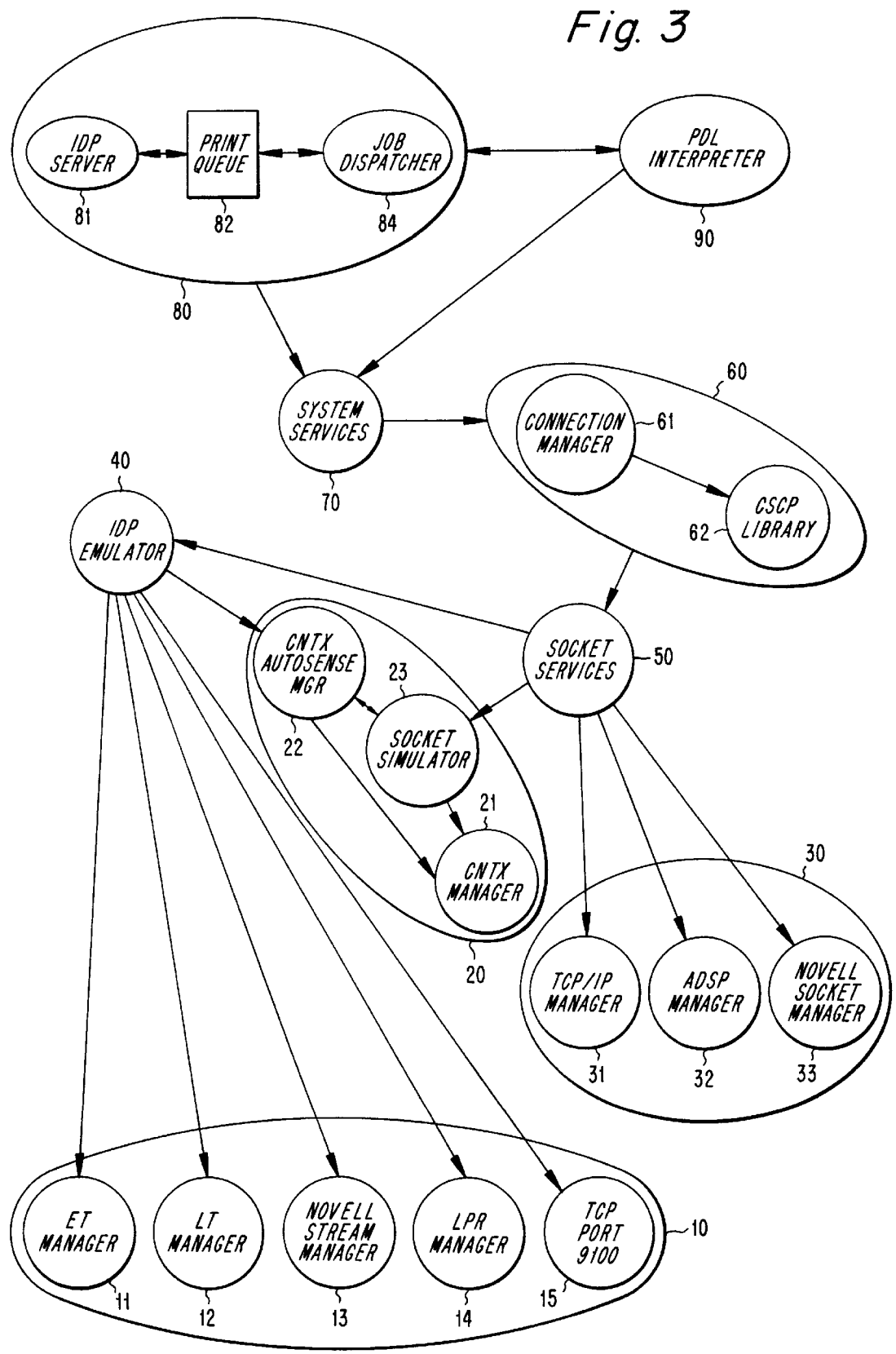
FIG. 3 illustrates a more detailed representation of the network architecture for an embodiment of the present invention.

FIG. 3 illustrates a more detailed example of the network services architecture for an embodiment of the present invention. The non-IDP network managers 10 correspond to a PAP/ET manager 11, a PAP/LT manager 12, a NOVELL stream manager 13, a LPR manager 14, and a TCP port 9100 manager 15 in this example. The parallel port manager 20 includes a CENTRONICS manager 21 and the IDP network managers 30 include a TCP/IP manager 31, an IDSP manager 32 and a NOVELL socket manager 33 in this example. The parallel port manager 20 includes a CENTRONICS autosense manager 22 for detecting between non-SSP and SSP data sent over the CENTRONICS ports and a socket emulator 23 handles SSP communication. The IDP emulator 40 directs the non-IDP data to the appropriate non-IDP network manager 10. The connection services layer 60 is shown to include a connection manager 61 and a CSCP library 62 for providing the symmetric protocol that facilitates connection between servers and clients over connection-based stream-oriented protocols.

The system services layer 70 is connected to the connection manager 61. The system services layer 70 provides interaction between the IDP server 80 and the PDL interpreter 90. The IDP server 80 is shown in FIG. 3 to include a print queue 82 and a job dispatcher 84. The PDL interpreter 90 interacts with the IDP server 80 when the job dispatcher 84 dispatches a job from the print queue 82. The information from the print queue 82 proceeds through the layers to connect with a client and obtain the actual print job data that will proceed from the client back up through the layers to the PDL interpreter 90 for printing at the network printer.

Figure 4:
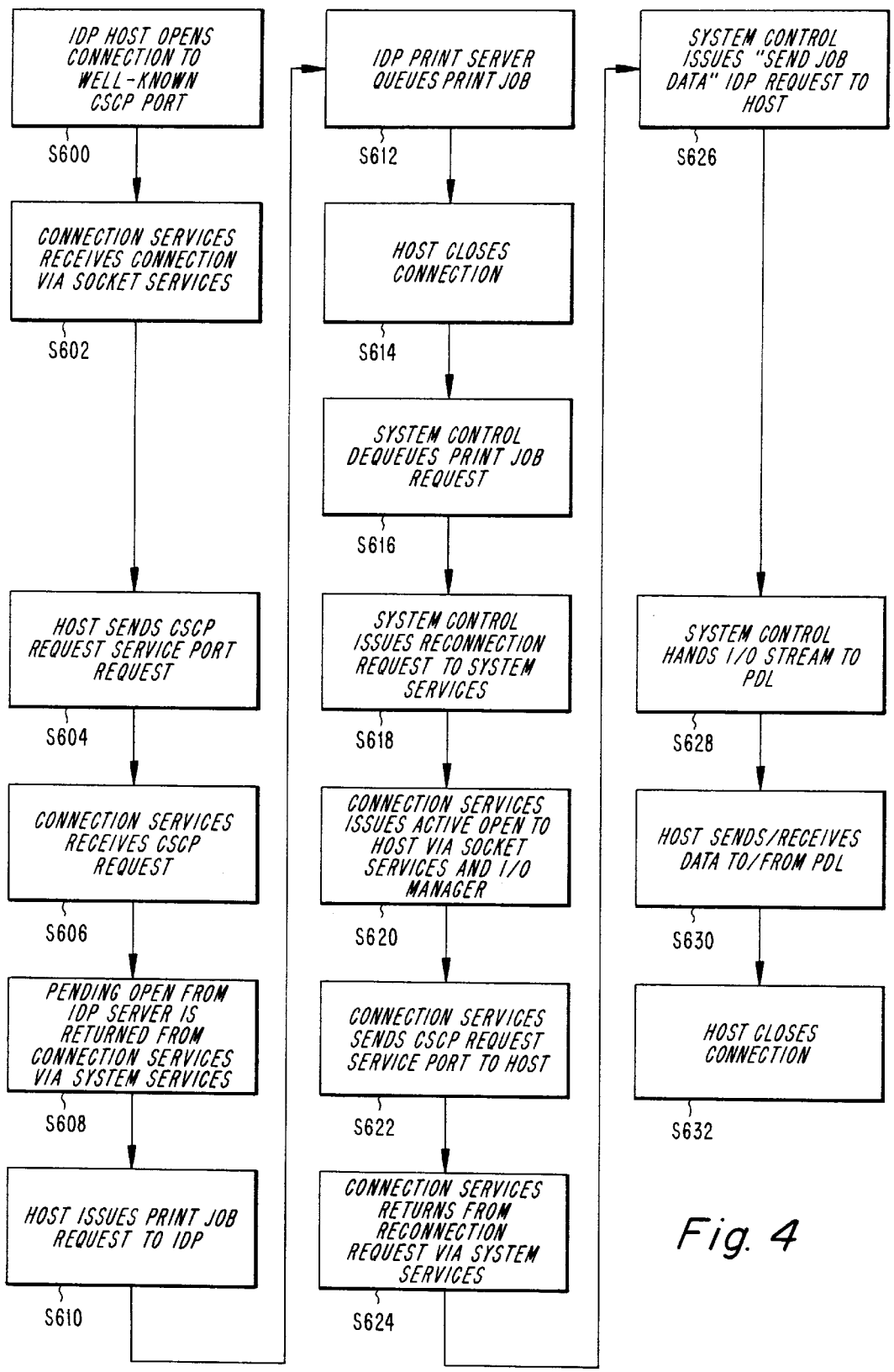
FIG. 4 illustrates a process for connections between IDP client and a printer for an embodiment of the present invention.

FIG. 4 illustrates a process for connections between IDP clients and the printer for an embodiment of the present invention. At step S600, an IDP host and IDP network manager opens a connection to a known CSCP port. The connection is received by the connection services layer 60 via the socket services 50 at step S602 and the IDP host sends a CSCP request service port request at step S604. The connection services layer 60 receives the CSCP request at step S606 and a pending open from the IDP server 80 is received from the connection services 60 via the system services 70 at step S608. At step S610, the IDP host issues a print job request to the IDP server 80 and the IDP server 80 queues the print job and the print queue 82 at step S612 and the connection is closed at step S614. The system services layer 70 dequeues the print job request at step S616, and issues a reconnection request at step S618. The connection service layer 60 issues and active open to the host via the socket services layer 50 and the I/O manager 30 at step S620 and the connection services 60 also sends a CSCP request service port request to the IDP host at step S622. At step S624, the connection services 60 returns from a reconnection request via the system services layer 70. The system services layer 70 issues "a send job data" IDP request to the host at step S626 and then the system services layer 70 sends the I/O stream to the PDL interpreter 90 at step S628. The host sends and receives data to and from the PDL interpreter 90 at step S630 and the host closes the connection at S632 when the sending and receiving of data is completed.

Figure 1:
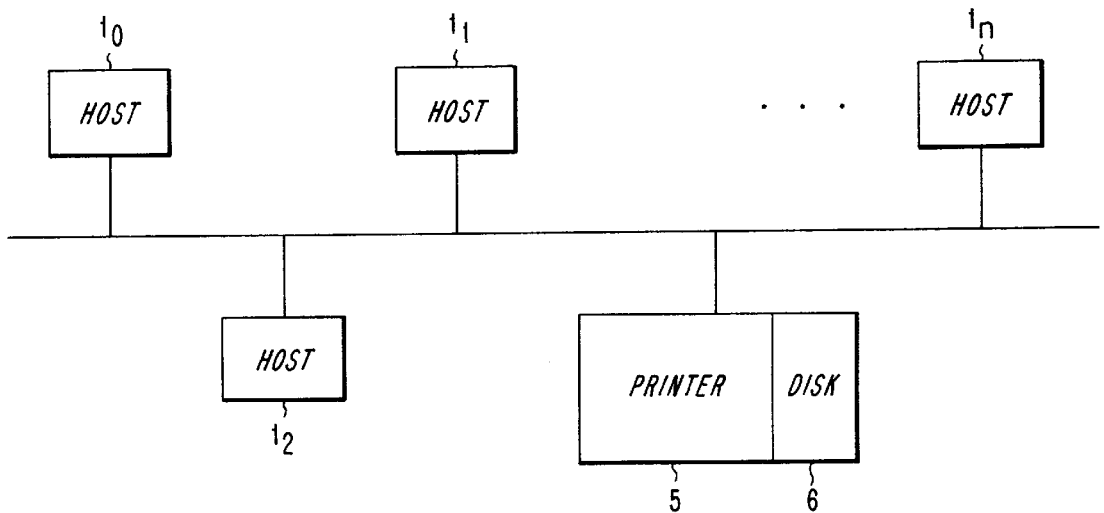
FIG. 1 illustrates a network using a conventional printing system.
Figure 6:
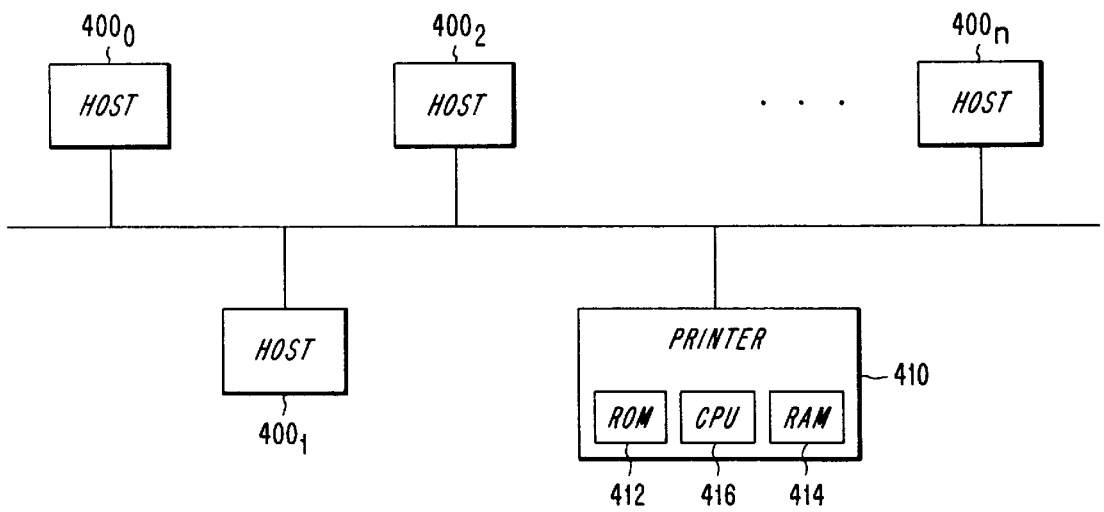
FIG. 6 illustrates the network configuration of a printing system for an embodiment of the present invention.

FIG. 6 illustrates a network configuration of a printing system for an embodiment of the present invention. In FIG. 6, a plurality of host computers $400_0$, $400_1$, ... $400_n$ and a printer 410 are connected in the network. The printer 410 includes a ROM 412, a RAM 414, and a CPU 416. The ROM 412 implements the layers of architecture for interfacing the host computers $400_{0..n}$ with the printer 410 in conjunction with the CPU 416. More than one ROM may be used to implement the layers of the architecture. The RAM 414 is used to implement the print queue 82 in the present embodiment. Because the print queue 82 only stores job information data without storing the actual print data, a small sized RAM 414 is used in contrast to a larger sized spooling disk as is conventionally used.

The print queue 82 contains job information for all of the print jobs that have an outstanding print request to the printer 410 for any of the host computers $400_{0..n}$ on the network. A print job request call is one example of the process for enabling communication with the print queue 82. Prior to sending a print job with a print job request call, the host computer sends a print request and a job ID is returned. When the print request is accepted, the job information is placed in the print queue 82. The parameters of the print job request call may include information about the print job and information for enabling the printer to notify the host computer when the job data can be accepted. When the printers are ready to capture the print job data, the printer may initiate a transmit job call which tells the host computer to start transmitting the print job to the printer. As print jobs are completed, their job information is removed from the print queue and entered into a job log. The job information in the print queue 82 may include the job name, the estimated time to print, the document status, the number of pages in the document, the number of pages left to print, the image content, the user comment, the media, and the creator application. The print job request call may provide this information and this information must be presented with the job in order to display.

The print queue 82 may also be manipulated by an operator from a local or remote user interface. Examples of queue manipulation commands include interrupt, resume, delete and reorder. In addition, queue manipulation may allow a user to change the job priority and sorting algorithms. For instance, a job sorting algorithm may print all jobs requiring a particular media, such as transparencies first and then, by queue manipulation, the media may be changed and all print jobs needing the newly loaded media may be printed.

In one example of a header format for IDP messages, the structure includes protocol, command, result code, message byte length, and data fields. IDP is a set of related protocols and the protocol suites are intended to map different cooperating servers that add value to a printing environment. A message can be initiated by either a host computer or the network printer. Currently, IDP includes a core protocol, a print protocol, and a font protocol. The core protocol contains commands that are common to all servers and are independent of their type. Printers may support the print protocol and font servers may support the font protocol. Common printers maintain fonts locally and therefore support part of the font protocol as well. As new types of servers are identified, additional protocols can be added to the suite of related protocols for IDP. The protocol field indicates which protocol of the IDP suite that the message is intended for. The command field indicates the command to which the message corresponds. The result code is a result of the command that is ignored on request commands. The message byte length field is the number of data bytes in the message. The data field includes message specific data and parameters.

The print job request command comes from a host computer to request the transmission of a job to the printer. When a print job request command is accepted, the information for a print job is placed in the print queue and the job ID is returned. The job ID is a unique numerical identifier for the print job and it could be used to reference print jobs and acquire further information and status. The print job request command may involve a dialog between the host computer and the printer to negotiate the connection to send the print job data on. The printer can elect to send back a result code on the response that gives the host computer an opportunity to send the print job data oil the same connection that they are currently communicating over. If the host computer chooses not to use this communication channel to send the print job data, a normal transmit job command will be used to solicit the print job data by the printer.

Figure 5:
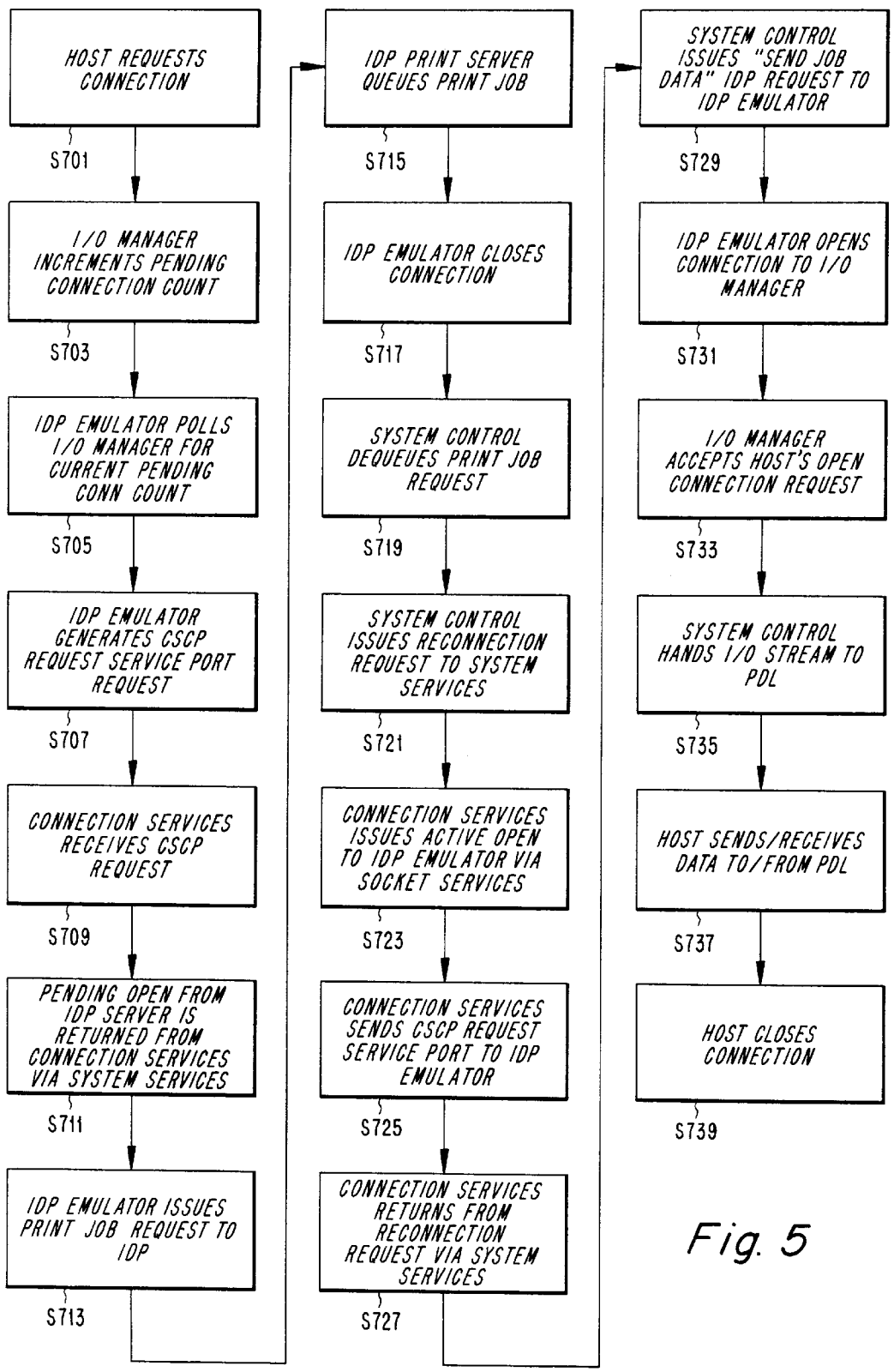
FIG. 5 illustrates a process for connections between non-IDP clients and a printer for an embodiment of the present invention.

A transmit job command is transmitted from the printer to inform the host computers to start transmitting the print job referred to by the job ID and an enumerate queue command is transmitted from the host computer and returns an ordered list of the jobs in the specified queue. The enumerate queue command counts parameters in the print queue and count records are returned in the order that they are scheduled to be printed for the print queue in the order that they were printed for the job log. A job record parameter may be included for estimating the time when the job will complete printing or the time that the job did complete. A token parameter may be used to represent the state of the queue. FIG. 5 illustrates a process for connections between non-IDP clients and the printer for an embodiment of the present invention. At step S701, a host requests a connection and an I/O manager increments a pending connection count at step S703. The IDP emulator 40 polls the I/O manager for the current pending connection at step S705 and the IDP emulator generates a CSCP request service port request at step S707. The connection services layer 60 receives a CSCP request at step S709 and a pending open from the IDP server 80 is returned from the connection services layer 60 via the system services layer 70 at step S711. The IDP emulator 40 then issues a print job request to the IDP server 80 at step S713 and the IDP server queues a print job at step S715. The IDP emulator 40 then closes the connection to the IDP server 80 at step S717 before the system services layer 70 dequeues the print job request at step S719 and then issues a re-connection request at step S721. The connection services layer 60 issues an active open call to the IDP emulator 40 via the socket services layer 50 at step S723 and sends a CSCP request service port to the IDP emulator 40 at step S725. The connection services layer 60 returns from the reconnection request via the system services 70 at step S727 and then the system services layer 70 issues a "send job data" IDP request to the IDP emulator 40 at step S729. The IDP emulator 40 opens a connection to the corresponding I/O manager at step S731 and the corresponding I/O manager accepts the open connection request from the host at step S733. Next, the system services layer 70 sends the I/O stream to the PDL interpreter 90 at step S735, the host sends and receives data to and from the PDL interpreter 90 at step S737 before closing the connection to the host at step S739 when the sending and receiving of data is completed.

The network printing system according to the embodiments of the present invention provides seamless plug and play connectivity for various heterogeneous network services protocol/ports. SSP allows a single channel to support multiple connections or circuits when implemented over a direct connect, non-network device. More specifically, SSP provides multiple data paths for allowing serial/CENTRONICS based host drivers to interact with the network printer in the same asynchronous model as an ADSP or TCP based drivers, for example. Thereby, a normalized interface to the network printer is provided so that all of the heterogeneous network services protocol/ports may interact in the same way. The printer system which implements SSP may also be easily integrated and extended as new protocol/ports are developed and introduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heterogeneous network printing system comprising:
   a plurality of host computers;
   a plurality of heterogeneous network services protocol/ports for connecting said host computers to form a network;
   a printer connected to the network; and
   a protocol simulating interface, including a socket simulation protocol, for simulating a multiple channel connection interface between one of said host computers and said printer when a single channel connection is initiated by said one of said host computers.

2. A heterogeneous network printing system according to claim 1, wherein said protocol simulating interface comprises a socket simulating protocol (SSP) for allowing said single channel connections by one of said host computers to interface with said printer in an asynchronous model as used in multiple channel connection host computers.

3. A heterogeneous network printing system according to claim 2, wherein said single channel connections comprise direct-connect, non-network-type connections and said multiple connections comprise stream-oriented-protocol-type connections.

4. A heterogeneous network printing system according to claim 2, wherein said protocol simulating interface senses between SSP and non-SSP data and simulates said multiple connection interface when SSP data is sensed.

5. A heterogeneous network printing system according to claim 2, wherein said socket simulating protocol generates SSP packets comprising a SSP sensing mark, a protocol revision bit, a control code, a source socket, a destination socket, a data length field, a header check sum field and data.

6. A heterogeneous network printing system according to claim 5, wherein said SSP sensing mark is used to distinguish transitions between SSP and non-SSP data.

7. A heterogeneous network printing system according to claim 5, wherein said control code defines message functions.

8. A heterogeneous network printing system according to claim 7, wherein said message functions comprise open connection, open connection reply, close connection, data transfer request, data transfer acknowledge, data transfer of file, and end of message functions.

9. A heterogeneous network printing system according to claim 5, wherein said source socket defines a socket number of one of said host computers sending a request.

10. A heterogeneous network printing system according to claim 5, wherein said destination socket defines a socket number of one of said host computers request destination.

11. A heterogeneous network printing system according to claim 5, wherein said header check sum field differentiates SSP and non-SSP data by generating a long word based on combining said protocol revision bit, said control code, said source socket and said destination socket.

12. A method for simulating interfaces in a heterogeneous network printing system comprising the steps of:
   (a) connecting a plurality of host computers to a printer in a network by a plurality of heterogeneous network services protocol/ports; and
   (b) using a socket simulation protocol to simulate a multiple connection interface between one of said host computers and said printer when a single channel connection is initiated by said one of said host computers.

13. A method according to claim 12, wherein said step (b) comprises the step of simulating a socket simulating protocol (SSP) which allows said single channel connections by ones of said host computers to interface with said printer in an asynchronous model as used in multiple channel connection host computers.

14. A method according to claim 13, wherein said single channel connections comprise direct-connect, non-network-type connections and said multiple connections comprise stream-oriented-protocol-type connections.

15. A method according to claim 13, further comprising the steps of sensing between SSP and non-SSP data and simulating said multiple connection interface when SSP data is sensed.

16. A method according to claim 13, wherein said socket simulating protocol generates SSP packets comprising a SSP sensing mark, a protocol revision bit, a control code, a source socket, a destination socket, a data length field, a header check sum field and data.

17. A method according to claim 16, wherein said SSP sensing mark is used to distinguish transitions between SSP and non-SSP data.

18. A method according to claim 16, wherein said control code defines message functions.

19. A method according to claim 18, wherein said message functions comprise open connection, open connection reply, close connection, data transfer request, data transfer acknowledge, data transfer of file, and end of message functions.

20. A method according to claim 16, wherein said source socket defines a socket number of one of said host computers sending a request.

21. A method according to claim 16, wherein said destination socket defines a socket number of one of said host computers request destination.

22. A method according to claim 16, wherein said header check sum field differentiates SSP and non-SSP data by generating a long word based on combining said protocol revision bit, said control code, said source socket and said destination socket.

23. A heterogeneous network printing system comprising:

a plurality of host computers;

a plurality of heterogeneous network service protocols/ports for connecting said host computers to a network;

a printer connected to the network; and a protocol simulating interface for simulating a multiple channel connection to said printer when a single channel connection is initiated by one of said host computers, wherein said protocol simulating interface comprises a socket simulating protocol (SSP), and wherein said protocol simulating interface automatically senses between SSP and non-SSP data received from a host computer.

24. A heterogeneous network printing system according to claim 23, wherein said socket simulating protocol allows a single channel connection initiated by a host computer to be implemented in accordance with an asynchronous model which is used to implement multiple channel connections between said host computers and said printer.

25. A heterogeneous network printing system according to claim 23, wherein single channel connections comprise direct-connect, non-network-type connections and said multiple channel connections comprise stream-oriented-protocol-type connections.

26. A heterogeneous network printing system according to claim 23, wherein said socket simulating protocol utilizes SSP packets comprising a SSP sensing mark, a protocol revision bit, a control code, a source socket, a destination socket, a data length field, a header check sum field and data.

27. A method for implementing a heterogeneous network printing system, comprising the steps of:

(a) connecting a plurality of host computers to a printer in a network using a plurality of heterogeneous network service protocols/ports;

(b) using a socket simulation protocol (SSP) to simulate a multiple channel connection between a host computer and the printer when a host computer initiates a single channel connection with the printer; and (c) using the SSP to automatically sense between SSP-type and non-SSP-type data sent to the printer from a host computer.

28. A method according to claim 27, wherein the socket simulation protocol allows a single channel connection between a host computer and the printer to be implemented in accordance with an asynchronous model used to implement multiple channel connections between the host computers and the printer.

29. A method according to claim 27, wherein single channel connections comprise direct-connect, non-network-type connections and said multiple channel connections comprise stream-oriented-protocol-type connections.

30. A method according to claim 27, wherein the socket simulation protocol utilizes SSP packets comprising a SSP sensing mark, a protocol revision bit, a control code, a source socket, a destination socket, a data length field, a header check sum field and data.

31. A method for conducting communications between components in a computing system, comprising the steps of:

initiating a single channel network connection between two components in the computing system; and using a socket simulation protocol (SSP) to transmit information packets over the single channel connection and to thereby simulate a multiple channel network connection between the two components.

32. A method according to claim 31, comprising the additional step of:

using the SSP to automatically sense between SSP-conforming and non-SSP-conforming data transmitted between the two components.

33. A method according to claim 31, wherein the socket simulation protocol utilizes SSP information packets comprising a SSP sensing mark, a protocol revision bit, a control code, a source socket, a destination socket, a data length field, a header check sum field and data.

34. A method according to claim 31, wherein one of the two components is a host computer and another of the two components is a peripheral device.

35. A method according to claim 34, wherein the peripheral device is a printer.

36. A peripheral device for use in a computer network, comprising:

a protocol simulating interface for simulating a multiple channel connection between a host computer and the peripheral device when the host computer initiates a single channel connection between the host computer and the peripheral device, wherein said protocol simulating interface comprises a socket simulating protocol (SSP) which allows the single channel connection between the host computer and the peripheral device to be implemented in accordance with an asynchronous model used to implement multiple channel connections between other host computers and the peripheral device, and wherein said protocol simulating interface automatically senses between SSP and non-SSP data received from the host computer.

37. A peripheral device according to claim 36, wherein said peripheral device functions as a printer.

* * * * *